US012784302B2

(12) United States Patent
Kodewitz

(10) Patent No.: US 12,784,302 B2
(45) Date of Patent: Nov. 3, 2026

(54) METHOD AND DEVICE FOR CHECKING VALUE DOCUMENTS AND METHOD AND DEVICE FOR GENERATING CHECKING PARAMETERS FOR THE CHECKING METHOD

(71) Applicant: GIESECKE+DEVRIENT CURRENCY TECHNOLOGY GMBH, Munich (DE)

(72) Inventor: Marja Kodewitz, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 328 days.

(21) Appl. No.: 18/560,446

(22) PCT Filed: May 13, 2022

(86) PCT No.: PCT/EP2022/025226

§ 371 (c)(1),
(2) Date: Nov. 13, 2023

(87) PCT Pub. No.: WO2022/242909

PCT Pub. Date: Nov. 24, 2022

(65) Prior Publication Data

US 2024/0257548 A1 Aug. 1, 2024

(30) Foreign Application Priority Data

May 21, 2021 (DE) ..................... 10 2021 002 672.1

(51) Int. Cl.
*G06V 30/41* (2022.01)
*G06T 7/73* (2017.01)
(Continued)

(52) U.S. Cl.
CPC ................ *G06V 30/41* (2022.01); *G06T 7/74* (2017.01); *G06T 11/60* (2013.01); *G06V 10/774* (2022.01);
(Continued)

(58) Field of Classification Search
CPC ...... G06V 30/41; G06V 10/774; G06V 30/14; G06V 30/148; G06V 30/42;
(Continued)

(56) References Cited

U.S. PATENT DOCUMENTS 8,588,477 B2 11/2013 Holl et al.
2007/0140551 A1 * 6/2007 He ......................... G07D 7/206
382/137

(Continued)

FOREIGN PATENT DOCUMENTS

CN 104464079 B 10/2016
CN 106803091 B 4/2020

(Continued)

OTHER PUBLICATIONS

International Search Report from corresponding PCT Application No. PCT/EP2022/025226, Oct. 27, 2022.

(Continued)

*Primary Examiner* — Said Broome
*Assistant Examiner* — Andrew Shin
(74) *Attorney, Agent, or Firm* — Workman Nydegger

(57) ABSTRACT

A method is provided for generating templates for checking value documents of a predefined value document type having at least two predefined production elements that optionally partially overlap, as well as digital training images of training value documents of the predefined value document type. The method involves: for each of the training images, determining position data sets having position coordinates in a coordinate space each describing the posi- (Continued)

tions of the production elements on the value document at least relative to one another; forming at least two position sub-regions of the coordinate space, each comprising at least one predefined number of position data sets. The position subregions contain no common position data sets; for each of the position sub-regions, determining a template using training images of the value documents; storing the template and position sub-region data describing the position and extent of each position sub-region.

19 Claims, 7 Drawing Sheets

(51) Int. Cl.

| | |
|---|---|
| ***G06T 11/60*** | (2026.01) |
| ***G06V 10/774*** | (2022.01) |
| ***G06V 30/14*** | (2022.01) |
| ***G06V 30/148*** | (2022.01) |
| ***G06V 30/42*** | (2022.01) |
| ***G07D 7/20*** | (2016.01) |

(52) U.S. Cl.
CPC ............ *G06V 30/14* (2022.01); *G06V 30/148* (2022.01); *G06V 30/42* (2022.01); *G07D 7/2016* (2013.01); *G06T 2207/20081* (2013.01); *G06T 2207/30176* (2013.01)

(58) Field of Classification Search
CPC .... G06V 30/1465; G06V 30/412; G06T 7/74; G06T 11/60; G06T 2207/20081; G06T 2207/30176; G07D 7/2016; G07D 7/12; G07D 7/206
See application file for complete search history.

(56) References Cited

U.S. PATENT DOCUMENTS

| | | | | |
|---|---|---|---|---|
| 2009/0245590 | A1 | 10/2009 | Holl et al. | |
| 2015/0310268 | A1* | 10/2015 | He .......................... | G06F 18/22 382/135 |
| 2019/0384955 | A1 | 12/2019 | Frieser et al. | |

FOREIGN PATENT DOCUMENTS

| | | | |
|---|---|---|---|
| CN | 111476109 | A | 7/2020 |
| CN | 112466033 | A | 3/2021 |
| DE | 102015212492 | A1 | 1/2017 |
| GB | 2564122 | A | 1/2019 |
| RU | 2707320 | C1 | 11/2019 |
| WO | 2008058742 | A1 | 5/2008 |
| WO | 2008146262 | A2 | 12/2008 |
| WO | 2019186189 | A1 | 10/2019 |

OTHER PUBLICATIONS

Indian Office Action from Corresponding Indian Patent Application No. IN202317075695, Oct. 3, 2025.
Chinese Office Action from Corresponding Chinese Patent Application No. CN202280036105.5, Mar. 12, 2026.

* cited by examiner

METHOD AND DEVICE FOR CHECKING VALUE DOCUMENTS AND METHOD AND DEVICE FOR GENERATING CHECKING PARAMETERS FOR THE CHECKING METHOD

BACKGROUND

The present invention relates to a method and a device for checking value documents and a method and a device for generating checking parameters for use in the method for checking value documents.

Value documents are understood here to mean sheetlike objects which represent for example a monetary value or an authorization and therefore ought not to be arbitrarily producible by unauthorized parties. Therefore, they have features which are not easy to produce, in particular copy, and the presence of which is an indication of authenticity. i.e. production by an authorized entity. Important examples of such value documents or types of value documents are smart cards, coupons, vouchers, checks and in particular banknotes.

In the case of banknotes, value document types can be differentiated further; in the context of the present invention, a value document type may be given by the currency and the nominal value of a banknote or the denomination and, if appropriate, the issuance or the period in which they were issued officially, for example by central banks. Insofar as the following explanations refer to banknotes, they apply, mutatis mutandis, to any other type of value documents.

Banknotes are often produced by printing on a substrate in a plurality of steps or production steps, a print layer being applied to the banknote substrate in each of the steps. The applied print layers should have predefined positions relative to the banknote substrate and/or to one another, but this is usually only approximately the case since the print layers may be displaced relative to one another owing to the dictates of production. Variations in the appearance of the banknotes arise as a consequence. The print layers may in this case partially overlap or overlie one another.

When a value document of a predefined value document type is checked by machine, for instance during the checking of the authenticity or state, in particular a state deterioration as a result of contaminations or erosions of printing ink, a digital image of the value document to be checked is often captured and used for the checking. In the context of the present disclosure, a digital image is understood to mean an image which comprises pixels and pixel data respectively assigned to the pixels. In this case, each pixel corresponds to a corresponding location in the image (or to a corresponding location on the value document) to which the pixel data apply. The pixel data can preferably represent brightnesses or color values of the respective pixels. Whether or to what extent the digital image satisfies at least one predefined checking criterion is checked during the checking, depending on the checking method used.

During the checking of the criterion, use is made of checking parameters which are specific to the checking method and which determine predefined properties of value documents of the predefined value document type. During the checking of the criterion, for example, some checking methods can involve checking whether pixels or pixel groups have properties stipulated by the checking parameters. The checking parameters can then comprise for example a template for value documents of the predefined value document type. In the context of the present application, a template is understood to mean data which contain pixels of at least one section of a digital image of a value document of the predefined value document type and template pixel data respectively assigned to the pixels. In this case, each pixel corresponds to a corresponding location in the image to which the pixel data apply. In this case, the resolution, that is to say the number of pixels relative to the area, and the arrangement thereof with respect to one another, preferably corresponds to that of the digital image of the value document to be checked of the predefined value document type. In this case, depending on the kind of template, the template pixel data can comprise at least one individual value and/or else a range for values to be regarded as permissible for the pixel data of a value document image to be checked.

In this regard, when checking for a state deterioration such as a contamination or an erosion of printing ink, as checking criterion it is possible to check whether the pixel data or values for pixels of an image of a value document lie within an interval for permissible values that is predefined by a template. If a value lies below the interval, a contamination can be deduced; if it lies above the interval, an erosion of printing ink can be deduced. Otherwise it is assumed that no deterioration is present for the pixel.

Such checking parameters and in particular also templates are adapted and created in each case for a predefined value document type, in the case of banknotes for example given by the currency and the value or the denomination and, if appropriate, the issuance.

By way of example, templates are often created by carrying out averaging over a large number of images of training value documents of the predefined value document type, such that an average value over the corresponding pixel data of the training value documents is used as template pixel data for a pixel. In the case of other templates, lower and upper limits for the intensity can be stipulated as template pixel data for pixels, which limits may be given by the minimum and maximum intensity values for the respective pixel over the set of training value documents.

Therefore, the same template is used for arbitrary value documents of the same value document type. However, variations in the position of the print layers lead to inaccurate templates, particularly in the case where interval limits are used.

During the checking of value documents of the predefined value document type, the variations in the position of the print layers as outlined above have the effect that these methods may work less accurately since the templates are not very accurate and/or tolerances for the compensation of the still permissible displacement of the print layers with respect to one another and thus of the variations of the pixel data that accompany the variation of the displacements have to be permitted.

Similar problems may occur if for example production-dictated fluctuations occur in the relative position of other production elements which at least partly determine the appearance of a value document. In the context of the present application, production elements are understood to mean elements of a value document which at least partly determine and/or influence the appearance of the value document in the visible or non-visible (e.g. IR and/or UV) spectral range, in particular print layers, and are produced or applied independently and/or in separate production steps of other elements, in particular production elements. Examples of production elements are print layers applied to a value document substrate by means of intaglio printing or offset printing, elements applied to the substrate by means of screen printing, such as e.g. images or characters with a color dependent on the viewing angle, or optically capturable security elements such as, for instance, watermarks introduced into the substrate or security threads embedded therein or films applied to the substrate, e.g. by means of hot embossing methods, optionally with holograms. To facilitate readability, the following explanations may refer in part to print layers. However, they apply, mutatis mutandis, to any kind of production elements, in particular to the above-described examples of production elements.

SUMMARY

The invention is based on the object of specifying a method for checking value documents of a predefined value document type which have at least two production elements, and a method for providing checking parameters for the checking method, which allow simple, accurate checking of such value documents. Furthermore, the invention is based on the object of specifying means for carrying out the methods.

The object is achieved by means of a method having the features of claim 1, and in particular a method for generating or forming templates for checking value documents of a predefined value document type, in particular banknotes, in which method value documents of the predefined value document type have at least two predefined production elements, in particular print layers and/or security elements, which optionally partially overlap, wherein digital training images of training value documents of the predefined value document type are used, each of which have pixels each assigned pixel data. It comprises the following steps: for each of the training images, determining position data sets having position coordinates in a coordinate space each describing the positions of the production elements on the value document at least relative to one another, and forming at least two, preferably at least four, position sub-regions of the coordinate space, each comprising at least one predefined number of position data sets, the position sub-regions containing no common position data sets. For each of the position sub-regions, the method then comprises determining a template using training images of the value documents, and storing the template and position sub-region data describing the position and extent of each position subregion. In this case, the templates and the position sub-region data are stored in a manner assigned to one another. The method is preferably carried out in a computer-aided manner. The method is also referred to hereinafter as an adaptation method since parameters for the actual checking method are adapted by the formation of templates.

The object is additionally achieved by means of a method having the features of claim 12, and in particular a method for checking value documents of a predefined value document type, each having two predefined production elements, in particular print layers and/or security elements, which optionally partially overlap, using at least two templates which are predefined for predefined position sub-regions for positions of the production elements, preferably templates generated by means of an adaptation method or method according to the invention for generating or forming templates for checking value documents of a predefined value document type. The method, also referred to hereinafter as checking method, comprises the following steps: providing a digital value document image of a value document to be checked of the predefined value document type, comprising pixels each assigned pixel data, determining a position of the production elements in the provided value document at least relative to one another, determining a template for the digital value document image depending on the determined position of the production elements and the predefined position sub-regions, and checking the digital value document image using the determined template. Such a method is also referred to hereinafter as checking method. In the sub-step of checking the digital value document image using the determined template, a method is used which is also referred to hereinafter as image checking method. Preferably, in the method, the templates are provided in a first step.

In the context of the invention, at least two templates and position sub-regions or position sub-region data respectively assigned to said templates are used. In this case, the position subregions or position sub-region data assigned to a respective template define those determined positions or at least relative positions of the production elements or position data in the case of a value document to be checked of the predefined value document type for which the template is to be used. For a value document to be checked, the suitable template for checking the valuable document can be determined depending on the determined positions or at least relative positions of the production elements. In this case, the position sub-regions or the position sub-region data stipulating them can be stored in a storage unit.

The adaptation method serves to provide templates which can be used in a checking method. In the checking method, checking a value document or the respective digital value document image can then be carried out using the template determined for the value document image. The adaptation method and the checking method, in particular also the kind of template(s) and the actual image checking method, must therefore be coordinated with one another. Preferably, the image checking method is predefined.

In the adaptation method, digital training images of training value documents of the predefined value document type are used. These may be present in the form of data which were previously captured and stored, for example. In other embodiments, it is also possible for the training images to be directly captured and processed further by means of a suitable device. The training value documents of the predefined value document type are a set of predefined value documents which preferably has at least partly different relative positions of the production elements such as occur typically, for example owing to the dictates of production. Accordingly, the training images show a corresponding variation of the relative positions of the production elements. The number of training value documents and thus training images is preferably greater than double the predefined number of position data sets.

In each case at least one position data set describing the position of the production elements on the corresponding training value document at least relative to one another is determined for each of the training images. The position of the production elements at least relative to one another can be determined by means of any desired methods here. By way of example, for each of the production elements, at least one so-called anchor element and an anchor point representing the position thereof can be predefined. In this case, the anchor element can preferably be an image section that is characteristic of the production element, for example a character or some other distinctive printed image section which is present in images of value documents of the predefined value document type, i.e. in particular in the training images. Such anchor elements can have been selected automatically and/or manually. In the images, the anchor elements or the positions of the anchor points can be determined by means of template matching or other correlation methods. In order to be able to stipulate the position of the production elements, preferably at least two anchor elements are predefined for each of the production elements.

If the positions of the production elements are determined independently of one another, it is always possible also to determine the position relative to one another. In this respect, the determination of the positions of the production elements independently of one another corresponds to a determination of at least the relative positions of the production elements.

In the methods, the position of the production elements is represented by position data sets with position coordinates in a predefined coordinate space. As position data sets, for each of the production elements, it is possible to use coordinates in relation to a reference system of the value document, for example of one corner and two edges of the value document. However, it is also possible to specify only coordinates of a displacement vector describing the offset of the production elements with respect to one another. This is advantageous particularly if a predefined production element from among the production elements always has the same position in the value document images.

Position sub-regions of the coordinate space in which position data sets lie or which encompass the position data sets are used in the methods. That is understood to mean that the corresponding position coordinates lie in the position sub-regions of the coordinate space. The position sub-regions can be stipulated by position sub-region data describing the position and extent of the position sub-regions. A position sub-region can be given for example by a set of explicitly specified position sub-region data. Preferably, however, the position regions can be given by intervals or interval limits for the position coordinates or by functions and parameters for the functions which delimit a respective position region.

In the adaptation method, at least two position sub-regions of the coordinate space are determined. Position sub-region data describing the position and extent of the respective position sub-region in the coordinate space are determined for this purpose.

Firstly, the position sub-regions are determined such that each of the position data sets for the training images used lies in one of the position sub-regions formed. In this respect, the position sub-regions cover, preferably completely, the position data sets of the training images. Secondly, these are chosen such that the position sub-regions contain no common position data sets. Consequently, different position sub-regions from among the position sub-regions contain no common position data sets. That means that none of the position data sets lies simultaneously in at least two different position sub-regions. In this respect, the position sub-regions do not overlap.

Furthermore, each of the position sub-regions comprises at least one predefined number of position data sets. That is to say that at least the predefined number of position data sets lies in each of the position sub-regions. The predefined number can be predefined depending on the requirements when forming a template for the position sub-region, but is more than 10 in any case. If the template is generated using statistical methods, for example averaging, a certain minimum accuracy can thus be attained by choosing the number depending on the minimum accuracy.

Preferably, at least four, better more, position sub-regions, in particular position sub-region data, and templates assigned thereto are formed and stored. Since the variation of the position coordinates and therefore that of the production elements in the position sub-regions is smaller than that for the used training images or training value documents overall, more accurate templates can be created. The templates and thus the checking should become more and more accurate with an increasing number of position sub-regions and thus a smaller extent of the position sub-regions.

For each of the position sub-regions, a template is then formed from the training images of the training value documents whose position data coordinates are contained or lie in the respective position sub-region. The respective position sub-region and the template determined therefor are therefore assigned to one another. The respective template and the position sub-region data assigned thereto are stored in a manner assigned to one another.

These templates and the assigned position sub-region data are preferably used in the checking method according to the invention for value documents of the predefined value document type. They can preferably be provided at the beginning of the checking method. By way of example, they can be stored in a checking device for carrying out the method.

In this checking method, a digital value document image of a value document to be checked is provided. In principle, it is sufficient for the image to be stored somewhere. Preferably, however, it is captured and then processed in real time by means of a suitable device. Preferably, the value document image has the same resolution as the training value documents and images the same region of the value document.

The position of the production elements is then determined from the value document image, the position being described by position data sets with position coordinates in a coordinate space. Preferably, the coordinate spaces when generating the templates and during the checking are identical. Otherwise the coordinates can be correspondingly transformed. Determining the position can be determined by means of any desired methods. By way of example, for each of the production elements, at least one so-called anchor element and an anchor point representing the position thereof can be predefined. In this case, the anchor element can preferably be an image section that is characteristic of the production element, for example a character or some other distinctive printed image section which is present in images of value documents of the predefined value document type, i.e. in particular also in the training images. Such anchor elements can have been selected automatically and/or manually. In the images, the anchor elements or the positions of the anchor points can be determined by means of template matching or other correlation methods. In order to be able to stipulate the position of the production elements, preferably at least two anchor elements are predefined for each of the production elements. Particularly preferably, the same position determining method that was also used when generating the templates is used.

Depending on the determined position, one of the templates is then determined, which is used for the further checking. This is preferably done by a process in which depending on the position of the sub-region data for the templates a check is made to ascertain which of the position sub-regions contains the position coordinates, and then the template assigned to it is determined. This template is then used for the further checking, preferably by means of an otherwise known image checking method.

Preferably, the checking method can furthermore comprise forming and outputting a check signal representing the result of the checking. By way of example, a further treatment of the value document imaged in the value document image can be controlled depending on said check signal.

The methods described are preferably implemented in a computer-aided manner.

The object is therefore furthermore achieved by means of a device having the features of claim 9 and in particular a device for generating or forming templates for checking value documents of a predefined value document type, in particular banknotes, wherein value documents of the predefined value document type have at least two predefined production elements, in particular print layers and/or security elements, which optionally partially overlap, wherein digital training images of training value documents of the predefined value document type are used, each of which have pixels each assigned pixel data, the device comprising a storage unit for storing digital training images of value documents of the predefined value document type, wherein the device is configured to carry out an adaptation method according to the invention using the training images. The device can preferably furthermore have an interface via which the generated templates and position sub-region data assigned thereto can be transmitted to another, preferably remote, device, for example a storage unit. The interface can preferably comprise an interface for a data network. The device is then preferably configured to transmit the generated templates and the position sub-region data assigned thereto to the other device. Additionally or alternatively, the device can preferably itself be configured to store the generated templates and the position sub-region data in a storage unit and/or the storage unit.

For this purpose, the device can have a computer, preferably comprising at least one processor, which is connected to the storage unit via a data connection. In this case, a computer is understood to mean an arbitrary data processing unit.

The subject matter of the present invention therefore includes a computer program comprising program code, in particular program code means, for carrying out an adaptation method according to the invention when the program is executed on a computer. In the case of the device, the computer program is preferably stored in the storage unit or a memory of the computer.

The subject matter of the present invention therefore includes a computer-readable data carrier comprising program code which is executable by a computer so that the computer carries out an adaptation method according to the invention.

The object is furthermore achieved by means of a device for checking value documents having the features of claim 13, and in particular a device for checking value documents, in particular banknotes, each having at least two predefined production elements, in particular print layers and/or security elements, which optionally partially overlap, using templates, produced in particular by an adaptation method according to the invention, and position sub-region data assigned to the templates, the device comprising an evaluation unit having at least one memory in which the templates and the position sub-region data respectively assigned thereto are stored, and an interface for providing a digital value document image, wherein the evaluation unit is designed to carry out a checking method according to the invention. Such a device is also referred to hereinafter as checking device.

The evaluation unit can in particular comprise a computer and have at least one processor, connected to the memory via a data connection. In the evaluation unit, program code which, when executed by the computer or processor, causes a checking method according to the invention to be carried out can then be stored in a program memory.

The subject matter of the present invention therefore includes a computer program comprising program code for carrying out a checking method according to the invention when the program is executed on a computer.

Further subject matter of the present invention includes a computer-readable data carrier comprising program code which, when executed by a computer, causes a checking method according to the invention to be carried out In principle, the checking device can operate independently of a unit used to capture a value document image. Preferably, however, the checking device furthermore has an image capture unit for capturing a digital value document image of a value document to be checked, said image capture unit being connected to the interface for providing a digital value document image via a signal connection. The image capture unit can preferably have a spatially resolving optical sensor, for example a camera. This has the advantage that an evaluation of a value document image can be carried out in real time directly in association with the capture of the value document image.

The checking device can furthermore have an interface which enables the checking device to output check signals representing a result of checking carried out.

The subject matter of the present invention therefore includes a device having the features of claim 17, and in particular a device for processing, in particular checking and/or counting and/or sorting and/or destroying, value documents of a predefined value document type, in particular banknotes, each having at least two predefined production elements, in particular print layers and/or security elements, which optionally partially overlap, the device comprising a feed unit for feeding individual or separated value documents to be processed, a dispensing unit having at least one dispensing section for receiving processed value documents, a transport unit for transporting individual or separated value documents from the feed unit to the dispensing unit, and a checking device according to the invention. Preferably, an image capture unit of the checking device is arranged on the transport path and designed such that digital value document images of value documents to be checked that are transported past the image capture unit are captured while being transported past and are provided for the use in the checking device. This device for processing value documents is also referred to hereinafter as processing device. Preferably, the processing device is configured to control the further processing of a transported value document depending on a result of the checking device during the checking of the digital image of the value document. By way of example, depending on the checking result, a transported and checked value document could be sorted into different sections of the dispensing unit or, given appropriate configuration of the processing device, could be shredded.

At least two templates which were determined and are used in each case for specific regions of positions of the production elements, the position sub-regions, are used in the methods. The extent and position of the position sub-regions are described by the position sub-region data.

In the adaptation method, the position sub-regions can be formed in any desired manner, in principle.

In one preferred embodiment of the adaptation method, forming the position sub-regions can comprise a plurality of division steps. In this context, in each of the division steps a current position sub-region from among those present which contains double the predefined number or more than double the predefined number of position data sets can in each case be divided into a predefined division number of newly formed position sub-regions each comprising at least the predefined number of position data sets. The respective current position sub-region from among those present can then be replaced by the newly formed position sub-regions. In this context, a region containing the position coordinates of all the training value documents is used as position sub-region in the first division step. The division steps are carried out as often as until all the position sub-regions formed satisfy at least one predefined termination criterion. The latter can be checked at the beginning or at the end of a division step. A current position sub-region from among those present can be understood to mean in particular a current position sub-region from among those present at the beginning of the respective division step.

One advantage of this procedure can be seen in the fact that position sub-regions are generated in which at least the predefined number of position data sets lies, but which do not have too many position data sets. Since the number of training images is predefined, that means that regions of the coordinate space in which many position data sets lie are subdivided more finely than other regions.

Preferably, the division number for a position sub-region to be divided, i.e. the number of position sub-regions which arise from a current position sub-region, is chosen such that the position sub-regions formed in the respective division step each comprise at least the predefined number of position data sets and at most double the predefined number of position data sets. This choice can result in the relevant part of the coordinate space being divided uniformly with respect to the number of training images. In regions having a greater density of position data sets, and training value documents corresponding thereto, position sub-regions formed are smaller than those formed in other regions. The templates in these regions will therefore be more accurate or allow more accurate checking.

The division of a current position sub-region can be effected in any desired manner, subject to the boundary conditions mentioned previously. In one preferred embodiment of the adaptation method, the coordinate space can be n-dimensional where $n>1$, and in each of the division steps a division can be carried out in only one of the dimensions. Preferably, successive divisions of a position sub-region and of resultant position sub-regions, with particular preference directly successive divisions of a position sub-region and of resultant position sub-regions, are carried out in different spatial dimensions in each case. A division of a position sub-region can thus be effected in a first dimension, and the subsequent division of the resultant position sub-regions in a different dimension. The advantage of this procedure is that the individual division is easy to carry out, but overall a division is effected in all directions.

The repeated divisions are carried out until the predefined termination criterion is satisfied. The termination criterion implicitly contains the sub-criterion that the number of position data sets in a position sub-region formed must not be less than the predefined number. The termination criterion can comprise further sub-criteria, however, in which case the termination criterion is satisfied when at least one of the sub-criteria, preferably all of the sub-criteria, are satisfied.

In one preferred embodiment of the method, the termination criterion can contain the criterion or sub-criterion that the position sub-regions contain at most a predefined multiple of, preferably double, the predefined number of position data sets. It is thereby possible to achieve generation of templates for position sub-regions whose size is substantially determined by the predefined number of position data sets: the position sub-regions are smaller in regions having a high density of position data sets, in which case, however, owing to the interval for the position data sets contained, the templates can however still satisfy minimum accuracy criteria.

In the method, however, the termination criterion can also contain the criterion or sub-criterion that the numbers of position data sets in the position sub-regions differ by less than a tolerance portion relative to a reference value, preferably the average value of the numbers of position data sets in the position sub-regions over all the position sub-regions then present. The tolerance value can be chosen to be 50%, for example. In other words, after carrying out a division step, it is then possible to form the number of position data sets in the position sub-regions then present, and the average value of the numbers. If numbers differ by less than the tolerance value, no more further divisions are carried out. As a result, the position sub-regions are then formed such that after the method has ended, the numbers of position data sets in the position sub-regions differ by less than the tolerance portion relative to the reference value.

In the method, however, the termination criterion can also contain a sub-criterion that concerns the extent of the position sub-region in the coordinate space. In this regard, in one preferred variant of the method, the termination criterion can contain the criterion or sub-criterion that an extent of the position sub-regions in at least one direction of the coordinate space in each case falls below a predefined maximum extent for the at least one direction. In the case of this configuration, it is possible to avoid position sub-regions which extend over a large region of position data sets and would thus lead to a comparatively inaccurate template owing to the then rather large offsets of the production elements.

In the method, however, the termination criterion can also contain the criterion or sub-criterion that the number of position sub-regions is less than or equal to a predefined number of position sub-regions. This possibility may be preferred if, for example for accelerating and/or simplifying the checking, in the case of a large number of training images, the intention is to generate only a number of templates and position sub-regions respectively assigned thereto which is not too large.

In the adaptation method, a template is formed for each of the position sub-regions. For this purpose, it is possible to use known methods for determining templates, which are preferably chosen depending on the checking method that uses the templates. In the simplest case, for determining a template for a position sub-region, only those training images are used for which position data sets which lie in the position sub-region were determined. In other cases, in the method, however, it can be preferred for determining the templates for the position sub-regions to involve using in each case the training images of those training value documents whose position data sets lie in the respective position sub-region and training images of those training value documents whose position data sets lie within a predefined distance from the boundary of the respective position sub-region but outside the position sub-region. This procedure can produce better templates primarily in the cases in which a boundary between two position sub-regions runs through a cluster of position data sets for the training value documents. The extent and position of the position sub-regions remain unchanged, however, in this context.

BRIEF DESCRIPTION OF THE DRAWINGS

The invention is explained even further below by way of example with reference to the drawings, in which.

DETAILED DESCRIPTION OF VARIOUS EMBODIMENTS

Figure 1:
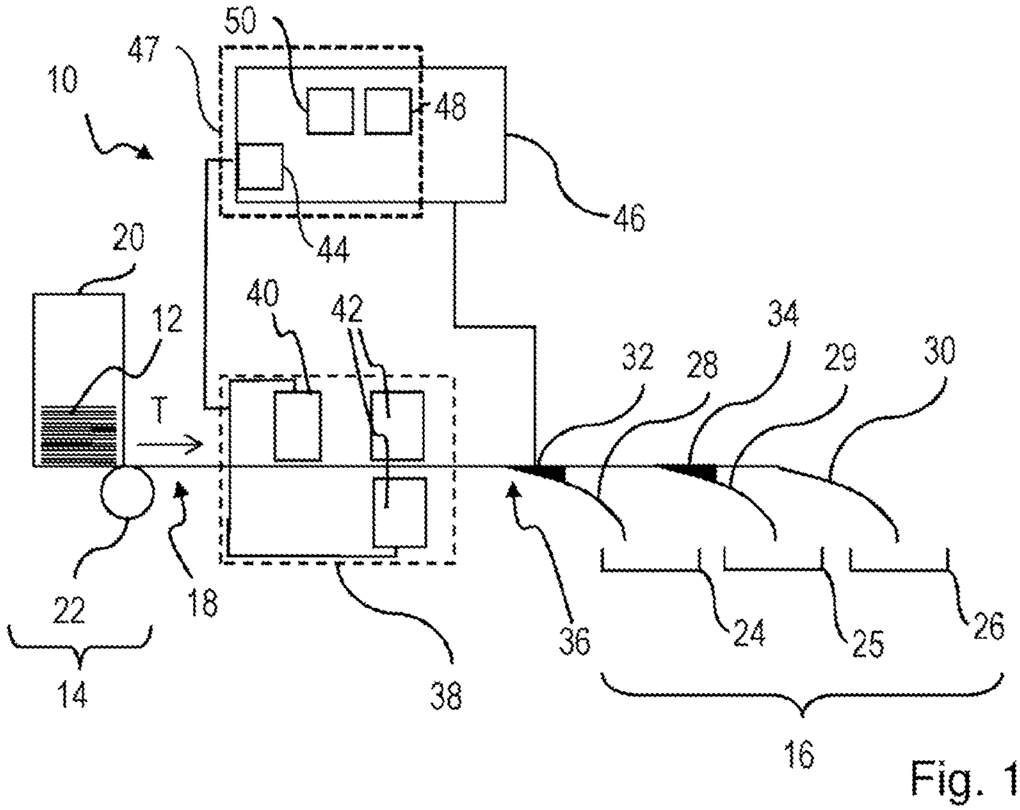
FIG. 1 shows a schematic illustration of a value document processing device, a banknote sorting device in the example.

A value document processing device 10 in FIG. 1, in the example a device for processing value documents 12 of a predefined value document type in the form of bank notes, is configured for sorting value documents 12 depending on the state determined by means of the value document processing device 10, and depending on the authenticity of processed value documents, which is checked by means of the value document processing device 10.

The device has a feed unit 14 for feeding value documents 12, a dispensing unit 16 for dispensing or receiving processed, i.e. sorted, value documents, and a transport unit 18 for transporting separated value documents from the feed unit 14 to the dispensing unit 16.

In the example, the feed unit 14 comprises an introduction compartment 20 for a value document stack and a separator 22 for separating value documents 12 from the value document stack in the introduction compartment 20 and feeding separated value documents to the transport unit 18.

In the example, the dispensing unit 16 comprises three dispensing sections 24, 25 and 26, into which processed value documents can be sorted depending on the interim result of the processing, checking in the example. In the example, each of the sections comprises a stacking compartment and a stacking wheel, not shown, by means of which value documents fed can be placed in the stacking compartment. In other exemplary embodiments, a dispensing section can be replaced by a unit for destroying banknotes.

The transport unit 18 has at least two, in the example three, branches 28, 29 and 30, at each of the ends of which one of the dispensing sections 24 and 25 and 26, respectively, is arranged, and, at the branch junctions, diverters 32 and 34, which are controllable by actuating signals and by means of which value documents are able to be fed to the branches 28 to 30 and thus to the dispensing sections 24 to 26 depending on actuating signals.

On a transport path 36—defined by the transport unit 18—between the feed unit 14, more precisely in the example the separator 22, and the first diverter 32 in the transport direction T downstream of the separator 22, there is arranged a sensor unit 38, which, while value documents are being transported past, captures physical properties of the value documents and forms sensor signals which represent the capture results and which constitute sensor data. In this example, the sensor unit 38 has an image capture unit 40 with an optical reflection sensor, which captures a reflection color image of the value document, and also other sensors 42—merely symbolized by boxes—for other physical properties of a value document.

A control and evaluation unit 46 is connected via signal connections to the sensor unit 38 and the transport unit 18, in particular the diverters 32 and 34. In conjunction with the sensor unit 38, it classifies a value document into one of predefined sorting classes depending on the signals or sensor data of the sensor unit 38 for the value document. These sorting classes can be predefined for example depending on a state value determined by means of the sensor data, and likewise depending on an authenticity value determined by means of the sensor data. It is possible to use for example the values "capable of circulation" or "not capable of circulation" as state values, and the values "counterfeit", "suspected counterfeit" or "authentic" as authenticity values. Depending on the sorting class determined, by way of the outputting of actuating signals, it controls the transport unit 18, more precisely here the diverters 32 and 34, such that the value document, according to its sorting class determined during the classification, is dispensed into a dispensing section of the dispensing unit 16 that is assigned to the class. In this case, the assignment to one of the predefined sorting classes or the classification is effected depending on criteria which are predefined for the assessment of the state and the assessment of the authenticity and which depend on at least one portion of the sensor data.

For this purpose, in particular besides at least one corresponding interface 44 for the sensor unit 38 or the sensors thereof, in particular of the image capture unit 40, the control and evaluation unit 46 has a processor 48 and a memory 50 connected to the processor 48, in which memory there is stored at least one computer program comprising program code which, when executed, causes the processor 48 to control the device and to evaluate the sensor signals of the sensor unit 38, in particular in order to determine a sorting class of a processed value document. Furthermore, program code is stored therein which, when executed, causes the processor 48 to control the device, and to control the transport unit 18 according to the evaluation.

The interface 44, the processor 50 and the memory 48 or a section of the memory 48 in which a corresponding computer program and method parameters are stored are part of a computer and form an evaluation unit 47 within the meaning of the present disclosure. In this example, the evaluation unit 47 evaluates the signals of the reflection sensor 40 separately from those of the other sensors. In addition, the processor 50 and other sections of the memory 48 can also fulfil other functions, in the example the control of the value document processing device 10.

The reflection sensor 40 is configured to capture an RGB reflection image of a value document while it is being transported past the reflection sensor 40 by means of the transport unit 18, and to generate a digital image therefrom, which the evaluation unit 47 evaluates.

Depending on the value document properties, the control and evaluation unit 46, more precisely the evaluation unit 47, using the sensor data of the various sensors, in sub-evaluations, determines in each case whether or not the value document properties determined represent an indication of the state and/or the authenticity of the value document. Subsequently, corresponding data can be stored in the control and evaluation unit 46, for example the memory 50, for later use. Depending on the sub-evaluations, the control and evaluation unit 46 then determines a sorting class as the overall result for the checking in accordance with a predefined overall criterion and forms the sorting or actuating signal for the transport unit 18 depending on the sorting class determined.

For the processing of value documents 12, value documents 12 that have been inserted into the introduction compartment 20 as a stack or individually are separated by the separator 22 and fed in separated form to the transport unit 18, which transports the separated value documents 12 past the sensor unit 38. The latter captures the properties of the value documents 12, with sensor signals that represent the properties of the respective value document being formed. The control and evaluation unit 46 captures the sensor signals or sensor data, and depending on these determines a sorting class, in the example a combination of an authenticity class and a state class, of the respective value document and, depending on the result, controls the diverters such that the value documents, according to the sorting class determined, are transported into a dispensing section assigned to the respective sorting class.

The evaluation unit 47 together with the image capture unit 40 form one example of a checking device for checking value documents of a predefined value document type, each having two predefined production elements, in particular print layers and/or security elements. Accordingly, the computer program contains instructions for carrying out a method for checking value documents of a predefined value document type, in particular banknotes, each having two predefined production elements, in particular print layers and/or security elements, using templates, produced in particular by means of an adaptation method outlined below, which are predefined for predefined positions of the production elements. In the checking method, by means of the reflection sensor 40, a digital value document image of a value document to be checked is captured and is provided in a corresponding section of the memory 50 in the evaluation unit 47. For the value document image provided, the relative position of the production elements with respect to one another is determined. In real time, a template for the digital value document image or the checking thereof is then stipulated depending on the determined position of the production elements using the position sub-region data. Afterward, the digital value document image is checked using the determined template.

Figure 2:
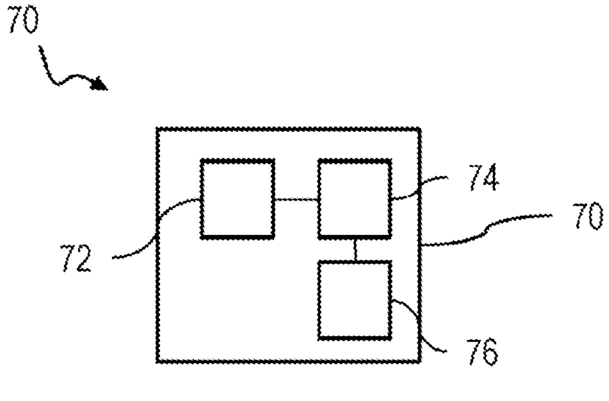
FIG. 2 shows a roughly schematic illustration of a device for generating templates, FIGS. 3A, B show roughly schematic illustrations of value documents which have different positions of production elements.

For providing templates, use is made of an adaptation device shown roughly schematically in FIG. 2, that is to say a device 70 for generating templates for checking value documents of a predefined value document type, wherein value documents of the predefined value document type have at least two predefined production elements, in particular print layers and/or security elements, which optionally partially overlap. The device 70 is a data processing unit comprising a storage unit 72 for storing digital training images of the predefined value document type and preferably generated templates. The adaptation device 70 is configured to carry out an adaptation method described below, using the training images, and to store the generated templates and the assigned position sub-region data in the storage unit 72. For this purpose, the device can have at least one processor 74 connected to the storage unit 72 via a data connection, and a program memory 76 connected to the processor 74 via a data connection, in which program memory there is stored program code which, when executed, causes the device to carry out, by means of the processor 74, the adaptation method outlined below using the training images stored in the storage unit 72. In other exemplary embodiments, the program memory 76 can also be formed by a section of the storage unit 72. The adaptation device 70 can furthermore have a data interface, not shown in the figure, for example a network card or LAN card, via which generated element templates stored in the storage unit 72 can be transmitted to another device.

Figure 3A:
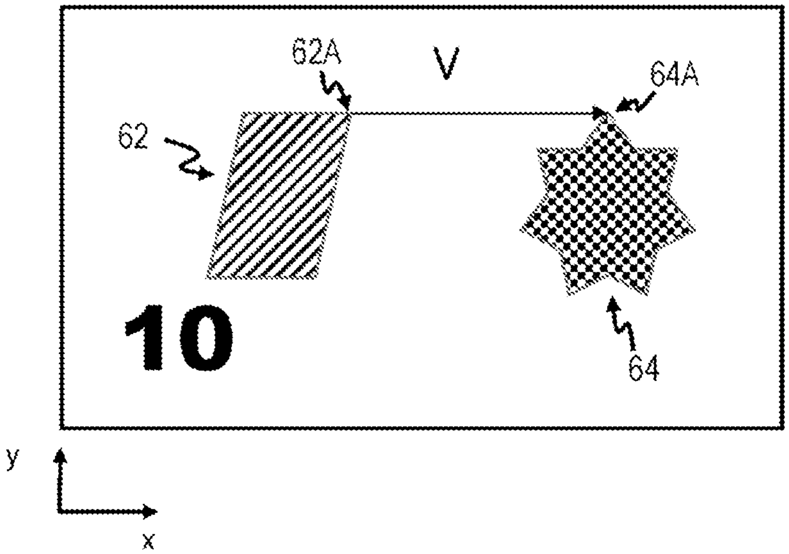
FIG. 3C shows a schematic illustration of a digital image captured from the value document in FIG. 3B.

One example of a value document 12 of a predefined value document type having two predefined production elements 62 and 64 in the form of print layers is shown roughly schematically in FIG. 3A.

Figure 3B:
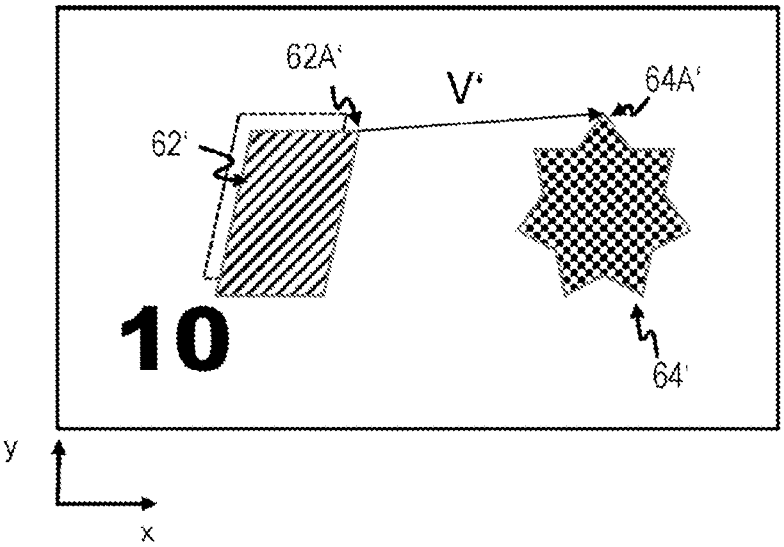

FIG. 3B shows another value document of the same value document type as in FIG. 3A, in which the relative position of the production elements 62' and 64'—corresponding to the production elements 62 and 64—with respect to one another differs from that for the value document in FIG. 3A. The position of the production element 62 in FIG. 3A is represented by a dashed line in FIG. 3B. The difference in the relative positions is illustrated in FIGS. 3A and 3B by a vector V and V', respectively, which points from one predefined characteristic element 62A and 62A', respectively, of the production element 62 and 62', respectively, to another predefined characteristic section or element 64A and 64A', respectively, of the production element 64 and 64', respectively. This vector will in turn be represented by two corresponding components in a two-dimensional Cartesian coordinate system, with an x-axis and a y-axis in the example.

Figure 3C:
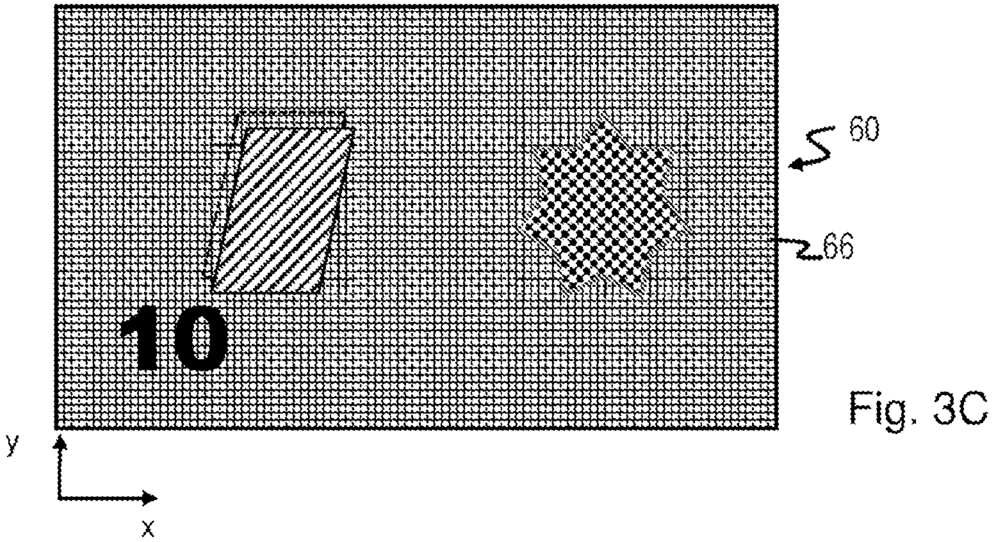

The digital image 60 of the value document in FIG. 3B is illustrated schematically again in FIG. 3C. It contains pixels 66, which in the example are arranged on a square grid and correspond to locations in the digital image and thus on the value document imaged. In this case, the image is preprocessed such that it represents only the value document 12 over the whole area, that is to say that the edges of the value document in the image run along the corresponding edge pixels. In this example, this preprocessing is carried out for all of the images, such that the images include corresponding representations. The vector V and V', respectively, can then be represented by corresponding pixel coordinates, which can preferably be non-negative integers. In this case, the x-axis and the y-axis run parallel to the long and short edges, respectively, of the value document in the image.

In the adaptation method, digital training images of training value documents of the predefined value document type are used. These are provided for the adaptation method in a first step. In the example, finished and clean, preferably freshly printed, value documents of the predefined value document type are used for this purpose, which preferably have variations in the position of the production elements. Preferably, the value documents also encompass those having large differences in the position of the production elements. Preferably, these are chosen such that they include corresponding value documents having different relative positions of the production elements 62 and 64, where with particular preference the frequency of value documents having given relative positions corresponds at least approximately to the frequencies of actual value documents of the predefined value document type.

Figure 4:
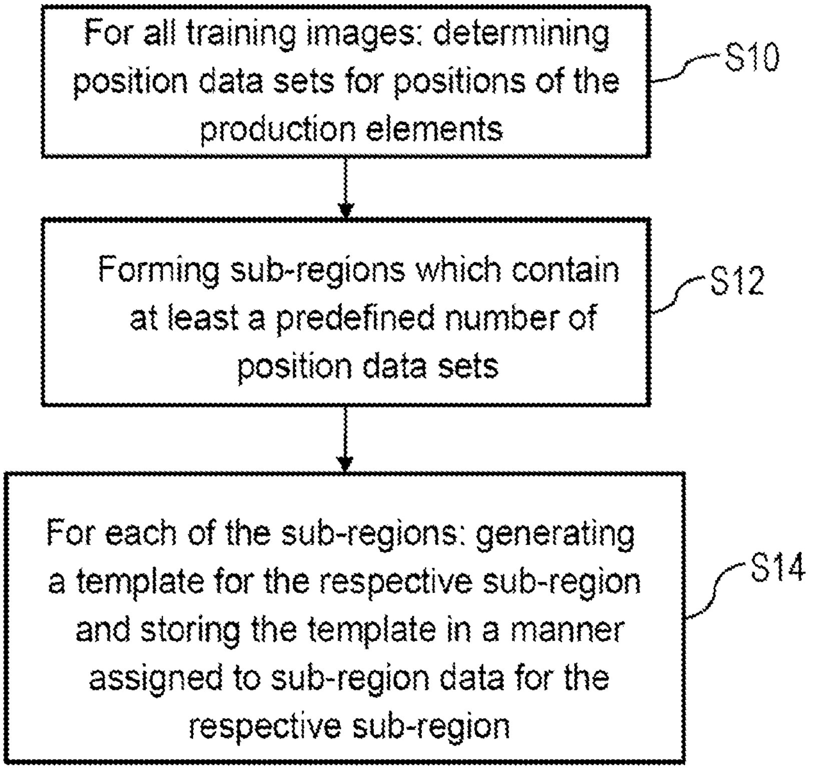
FIG. 4 shows a roughly schematic flowchart for one example of an adaptation method for generating templates.

The following exemplary adaptation method illustrated roughly schematically in FIG. 4 is used for generating templates.

The training images can be captured for example by the processing device 10 described, in particular the reflection sensor 40, for which purpose the digital images fed to the evaluation unit 47 are stored. These can be transmitted by means of a storage medium or via a data connection (not shown) to the adaptation device 70, where they are stored in the storage unit 72 and thus provided. The digital images each have identical numbers and arrangements of pixels and show the entire value document.

In step S10, a position data set having position coordinates in a coordinate space is determined for each of the training images. The position data set or the position coordinates therein describes in each case the position of the production elements on the value document relative to one another. In the example, two production elements are used; the coordinate space is therefore two-dimensional.

The positions are each determined in relation to the same position reference system, given by the edges of the value document in the image or, since the image shows only the entire value document, by the edges of the image or corresponding axes.

For determining the positions, anchor regions 62A and 64A are used in the present example, which were stipulated beforehand for value documents of the predefined value document type and are characteristic of the production element and in particular always visible. In order to simplify the illustration, only one anchor region in each case is used in this exemplary embodiment; in other exemplary embodiments, preferably at least two or more anchor regions are used for each of the production elements. Using methods known per se, the anchor regions can be sought in each case in the digital images. In the present example, the average value over the locations of the specimen can be used as the position of the anchor region. For each of the training value documents or training images, the relative position in the form of a vector as mentioned above is stored in a manner assigned to the training image, for which purpose corresponding vector components are used, which are also regarded as position coordinates. In the example, each of the vectors leads from the anchor region 62A to the anchor region 64A. The result of this step is therefore a set of training images and—respectively assigned thereto—vectors or vector components $\Delta x_{AB}$ and $\Delta y_{AB}$ in the mutually orthogonal directions or dimensions of the coordinate space: a vector is thus assigned to each training image.

Figure 5:
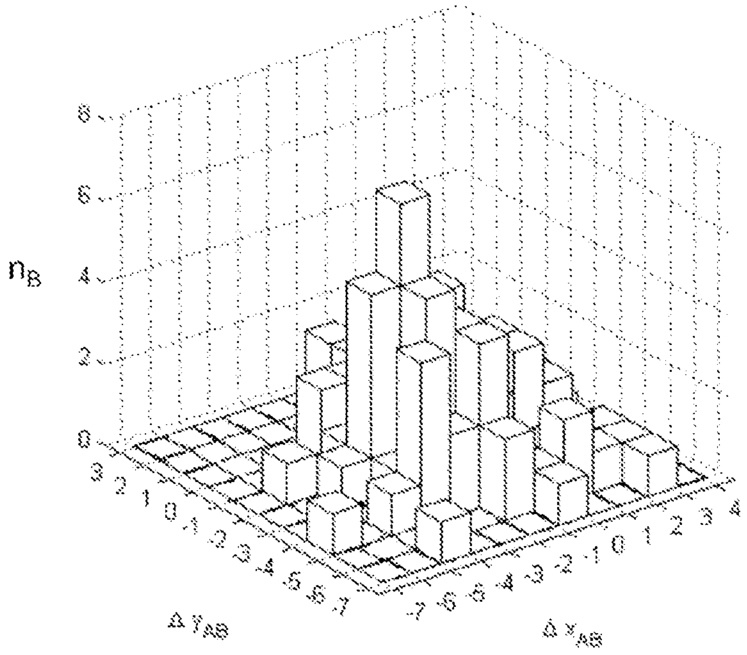
FIG. 5 shows a schematic frequency chart for positions of production elements in predefined training images.

An exemplary distribution of vectors or vector components is illustrated in the representation in FIG. 5. Since the coordinates and thus the vector components $\Delta x_{AB}$ and $\Delta y_{AB}$ are integers, the frequencies or numbers ng with which specific relative positions or vectors have occurred in the training images can be represented as bars in a two-dimensional bar chart, the height of which corresponds to the number of training value documents. Typically, relative positions in the vicinity of the relative position predefined by a specification are particularly frequent, while relative positions with larger deviations from the predefined relative position are less common.

Step S12 involves forming at least two position sub-regions of the coordinate space, each comprising at least one predefined number of position data sets, the position sub-regions, that is to say in each case different position sub-regions from among the position sub-regions, containing no common position data sets.

The position sub-regions can have any desired predefined shapes, in principle, but the position sub-regions preferably all have the same shape, a rectangular shape in the example. The position sub-regions can differ, however, at least in terms of the position and optionally also the dimensions, the side lengths in the example. The position, shape and dimensions or size of a position sub-region are described by suitable position sub-region data, which preferably, as in this exemplary embodiment, are given by coordinates of suitable points in the coordinate space which describe the position and at least dimensions. In the case of the example of rectangles, assuming for example that the shape of a rectangle is chosen as shape in the method, the coordinates of diagonally opposite corner points of a respective rectangular position sub-region can be used.

Figure 6:
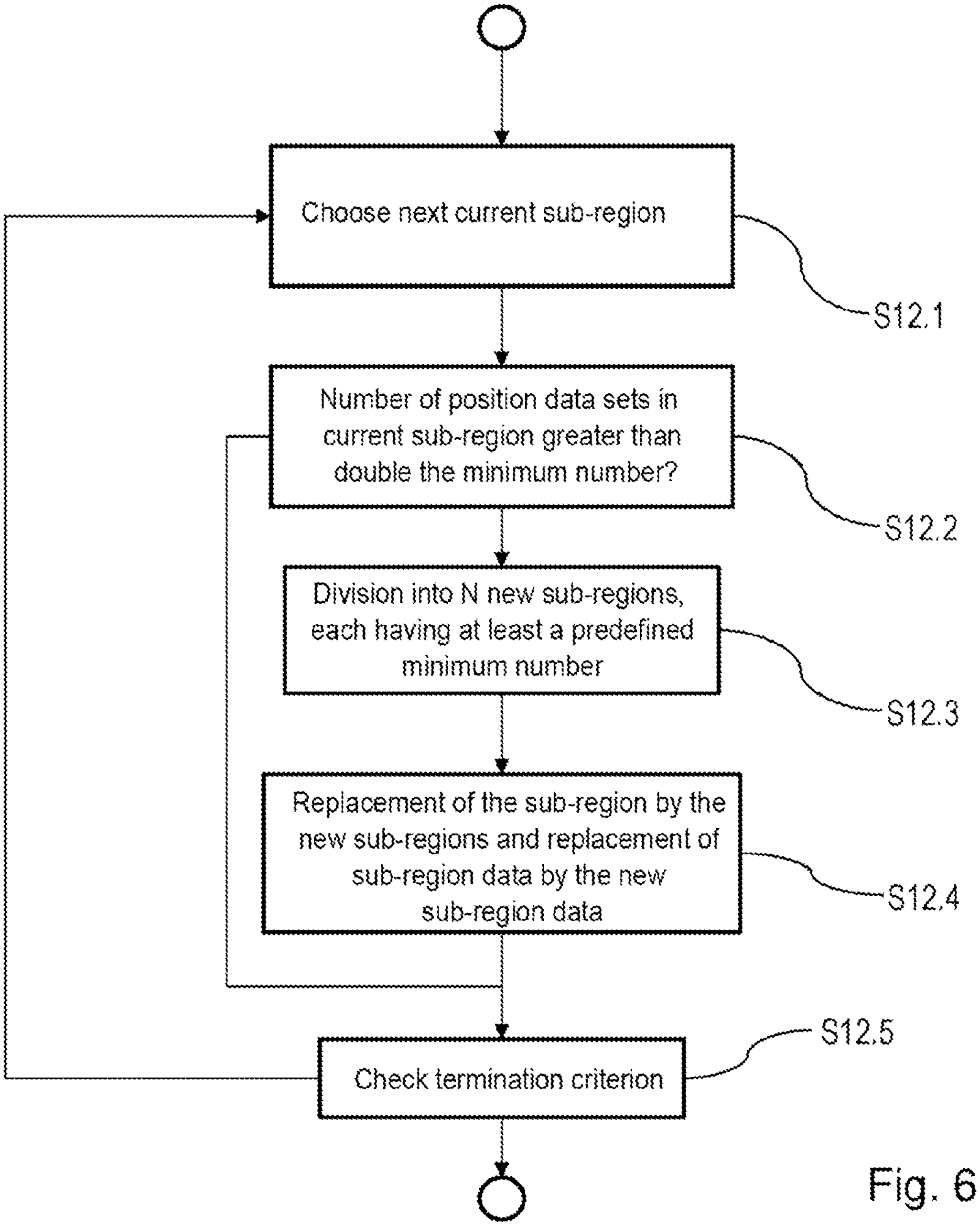
FIG. 6 shows a flowchart with sub-steps of a step S12 in FIG. 4, FIGS. 7A-D show illustrations of position data sets in a coordinate space in various division cycles in accordance with FIG. 6.

As illustrated roughly schematically in FIG. 6, in step S12 for forming the position subregions, sub-steps are carried out, if appropriate repeatedly, until a predefined termination criterion is satisfied. In the steps, each current position sub-region, if possible, is divided into N newly formed position sub-regions, each containing however at least one predefined number of position data sets. In the present example, N=2.

When the steps are carried out for the first time, the position sub-region used for the first division step is a region which contains the position coordinates of all the training value documents, in the example the smallest rectangular region in which all the position data sets lie.

In this exemplary embodiment, during a division of a respective position sub-region, a division is carried out in only one of the dimensions, preferably one of the dimensions or directions of the coordinate space.

In the example, successive divisions of a position sub-region and of resultant position subregions are carried out in each case in different spatial dimensions or spatial directions of the coordinate space.

More precisely, in the adaptation method of the example, a division is effected in each case along one of two mutually orthogonal division directions. These are the coordinate axes of the coordinate space in the example.

If a position sub-region was divided by division in a first division direction, in the case of this the division is effected in a second division direction orthogonal to the first. This is done in such a way that, for the resultant position sub-regions in the event of a division, the direction along which the division was effected during their formation is stored or the direction along which the next division has to be effected is stored. During the very first division, one of the division directions is predefined and used. During the next division, the division direction to be correspondingly used can then be determined.

More precisely, in step S12.1, a next position sub-region to be processed is selected from the current position sub-regions present.

The subsequent step S12.2 involves checking whether the number of position data sets in the current position sub-region selected is greater than N times the minimum number. If that is not the case, a division into position sub-regions each having at least the minimum number of position data sets is not possible. The method is then continued with step S12.5, in which a termination criterion is checked. This is described in even greater detail below.

By contrast, if the number of position data sets in the current position sub-region selected is greater than N times the minimum number, the current position sub-region is divided into N position sub-regions in step S12.3. If the current position sub-region resulted from division along a first of the division directions, the second of the division directions, which runs orthogonally to the first division direction, is used in step S12.3. The division is effected such that at least the minimum number of position data sets lies in each of the resulting position sub-regions.

There are usually a number of possibilities for this. In the example, the division is effected such that for a rectangular position sub-region, the number of position data sets therein is determined. If this number is less than three times the predefined number, the position sub-region is divided along the predefined direction into two newly formed position sub-regions containing approximately the same number of position data sets. Otherwise, division along the predefined direction results in the formation of one position sub-region containing the predefined number of position data sets, and another position sub-region having at least double the predefined number.

In step S12.4, the current position sub-region or the position sub-region data stipulating the latter is replaced by the newly formed position sub-regions or the position sub-region data stipulating the latter. For the newly formed position sub-regions, position sub-region data specifying in each case the position and shape of the position sub-regions are stored, in a manner respectively assigned to said position sub-regions. Afterward, step S12.5 is carried out, in which the termination criterion already mentioned above is checked.

The division steps S12.1 to S12.4 are carried out as often as until all the position sub-regions formed satisfy at least one predefined termination criterion, which in the example is checked in step S12.5 already mentioned. If said criterion is satisfied, no further division is performed, and the method is continued with step S14. Otherwise a renewed division is attempted, for which purpose step S12.1 is carried out anew on the basis of the position sub-regions then present.

The termination criterion can be a single criterion or can comprise a plurality of sub-criteria which have to be satisfied either cumulatively or alternatively in order that the termination criterion is deemed to be satisfied.

In the present exemplary embodied, what is checked as criterion is merely whether at least one position sub-region present at this point in time contains less than N times or N times the minimum number of position data sets. If this is the case, the termination criterion is satisfied, step S12 is ended and the method is continued with step S14. Otherwise the method is continued with step S12.1.

Figure 7A:
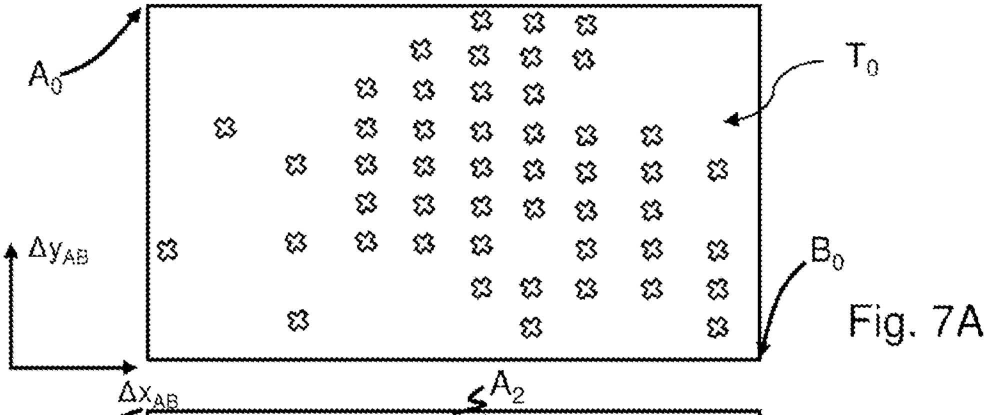
Figure 7B:
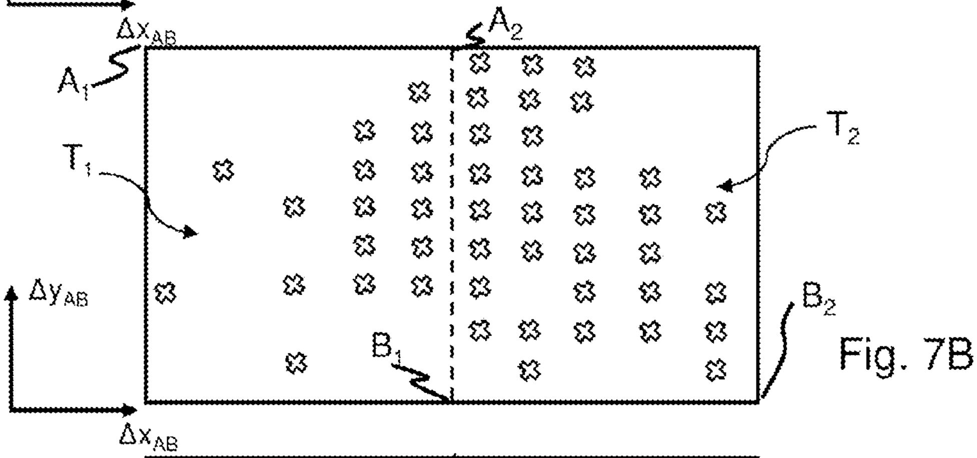

Some of the division steps are illustrated in a highly simplified manner for a concrete example in FIGS. 7A to 7D. FIG. 7A shows the initial situation before the first division: in the coordinate space, here a Cartesian coordinate system with coordinate axes $\Delta x_{AB}$ and $\Delta x_{AB}$, the relative positions of the production elements of all the training images used are represented by small crosses. They lie within a position sub-region $T_0$ in the form of a rectangle, chosen as first position sub-region in step S12.1. The position and size of the position sub-region are described by two diagonally opposite corner points $A_0$ and $B_0$ (top left corner and bottom right corner) or the coordinates thereof as position sub-region data. To simplify the illustration, 5 is the number chosen as the minimum number of position data sets.

After checking the number of position data sets in the region $T_0$ in a step corresponding to step S12.2, the $\Delta x_{AB}$ direction is chosen as division direction for the chosen position sub-region in a step corresponding to step S12.3. A corresponding division line is illustrated in a dashed manner in FIG. 7B. Division results in the position sub-regions $T_1$ and $T_2$, each having at least the minimum number of position data sets.

In a step corresponding to step S12.4, the position sub-region $T_0$ is replaced by the newly formed position sub-regions $T_1$ and $T_2$. Furthermore, the position sub-region data $A_0$ and $B_0$ are replaced by corresponding position sub-region data A and $B_1$, and $A_2$ and $B_2$.

Figure 7C:
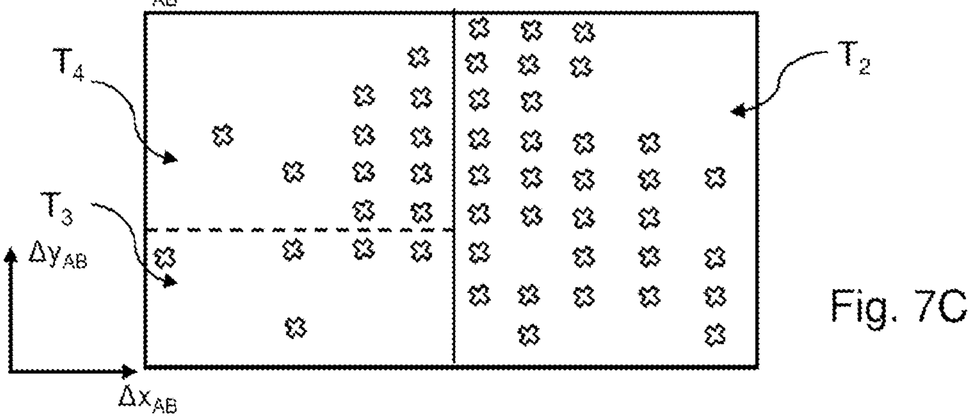

After checking the termination criterion in a step corresponding to step S12.5, in a further loop in a step corresponding to step S12.1 the position sub-region $T_1$ is chosen as the next position sub-region to be divided (also cf. FIG. 7C).

As illustrated in FIG. 7C, a division is then effected in a direction orthogonal to the division direction in the preceding step S12.3, namely the second axis, the $\Delta y_{AB}$ axis, of the coordinate space or coordinate system. The division is effected in such a way that both newly formed position sub-regions $T_3$ and $T_4$ contain at least the minimum number of position data sets. In the example, the region $T_3$ is chosen such that one of the position sub-regions formed contains the smallest possible number of position data sets, which however is greater than or equal to the minimum number. The division line is once again illustrated in a dashed manner.

In a step corresponding to step S12.4, the position sub-region $T_1$ is replaced by the newly formed position sub-regions $T_3$ and $T_4$. Furthermore, the position sub-region data $A_1$ and $B_1$ are replaced by corresponding position sub-region data $A_3$ and $B_3$, and $A_4$ and $B_4$.

Figure 7D:
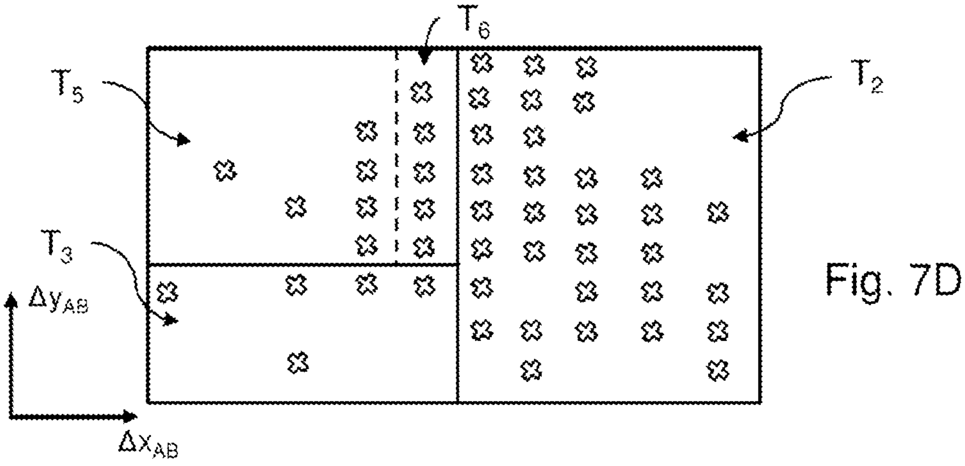

After checking the termination criterion in a step corresponding to step S12.5, in a further loop in a step corresponding to step S12.1, from the position sub-regions $T_2$, $T_3$ and $T_4$ now present, a position sub-region, in the example the position sub-region $T_4$, is chosen as the next position sub-region to be divided (also cf. FIG. 7D). The position sub-region $T_3$ has less than double the predefined minimum number of position data sets, and therefore can no longer be divided further.

As illustrated in FIG. 7D, a division is then effected in a direction orthogonal to the division direction in the preceding step S12.3, namely the first axis, the $\Delta x_{AB}$ axis, of the coordinate space or coordinate system. The division is effected in such a way that both newly formed position sub-regions $T_5$ and $T_6$ contain at least the minimum number of position data sets. In the example, the region $T_5$ is chosen such that one of the position sub-regions formed contains the smallest possible number of position data sets, which however is greater than or equal to the minimum number. The division line is once again illustrated in a dashed manner.

In a step corresponding to step S12.4, the position sub-region $T_4$ is replaced by the newly formed position sub-regions $T_5$ and $T_6$. Furthermore, the position sub-region data $A_4$ and $B_4$ are replaced by corresponding position sub-region data $A_5$ and $B_5$, and $A_6$ and $B_6$.

After checking the termination criterion in a step corresponding to step S12.5, in a further loop in a step corresponding to step S12.1 the sole position sub-region $T_2$ now present is chosen as the next position sub-region to be divided (also cf. FIG. 7D). The division is then continued analogously to the divisions described above until the termination criterion is satisfied.

After the end of step S12 and thus of the divisions, step S14 involves, for each of the position sub-regions formed, determining a template using training images of the value documents whose position coordinates lie in the respective position sub-region. Furthermore, for the position sub-regions formed, the template respectively determined and, assigned to the template, position sub-region data describing the position and extent of the respective position sub-region are stored.

The pixel data for the pixels of the template are determined depending on the corresponding pixel data of those training images whose position coordinates lie in the respective position sub-region. For checking contamination, for example, as pixel data it is possible to stipulate lower and upper limits for permissible pixel data values, these resulting from the minimum and maximum, respectively, of the corresponding pixel data of the corresponding pixels in the training images.

The position sub-region data preferably specify the position and extent for a given shape of the position sub-region or the position, extent and the shape of the respective position sub-region. In the present example, a rectangle is predefined as the shape, and the coordinates of diagonally opposite corners of the rectangle in the coordinate space used are used as position sub-region data. These represent both the position and the extent of the respective position sub-region.

Figure 8:
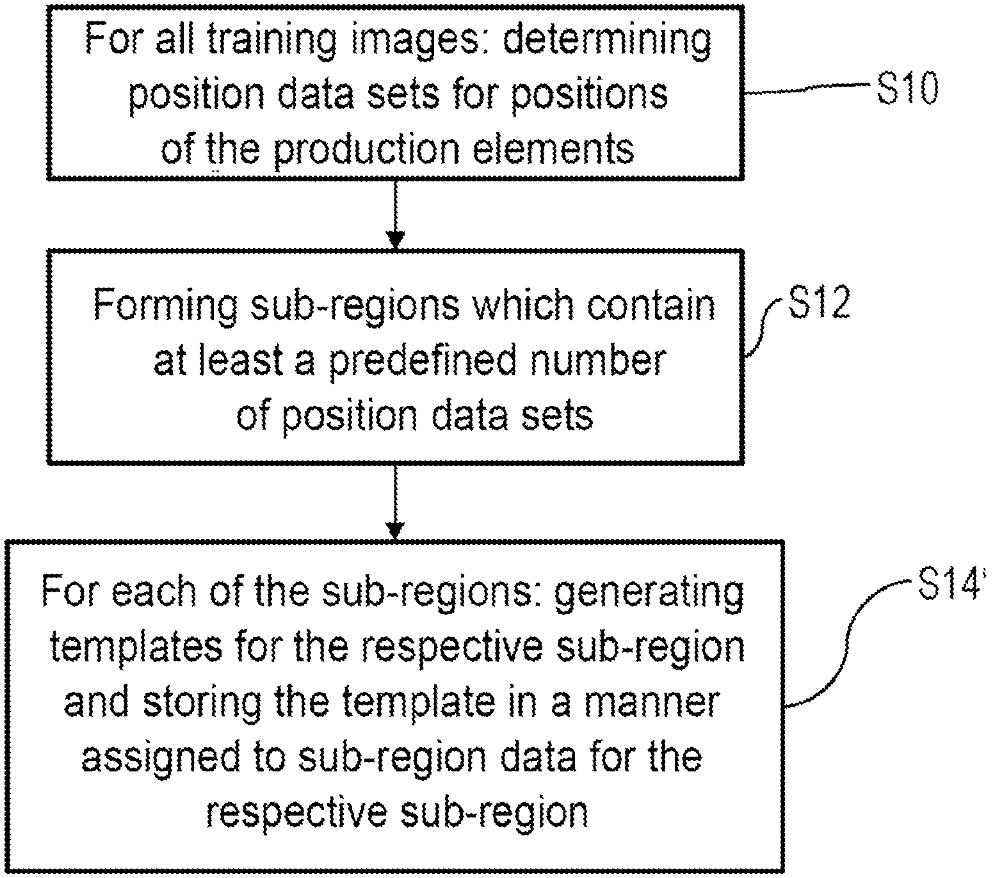
FIG. 8 shows a roughly schematic flowchart for a further example of an adaptation method for generating templates.

A further exemplary embodiment of an adaptation method, illustrated roughly schematically in FIG. 8, differs from the preceding exemplary embodiment merely in that step S14 is replaced by a step S14'.

Step S14' differs from step S14 in that determining the templates for the position sub-regions involves using not only the training images of those training value documents whose position data sets lie in the respective position sub-region but in addition also training images of those training value documents whose position data sets lie within a predefined maximum distance from the boundary of the respective position sub-region but outside the position sub-region. The actual determination is effected analogously to the determination in the first example.

In the example, the maximum distance is 1 pixel.

Figure 9:
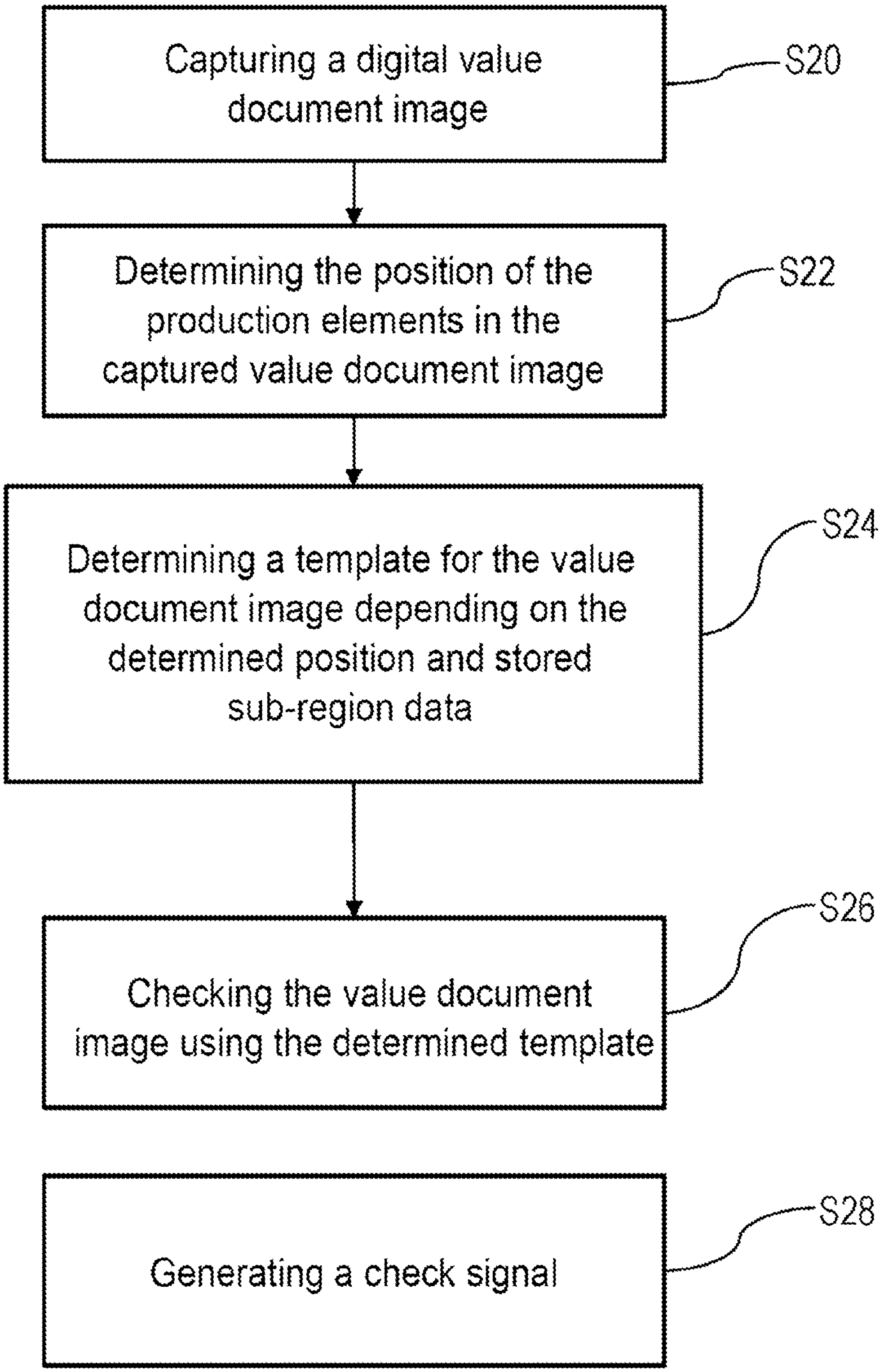
FIG. 9 shows a roughly schematic flowchart for one example of a checking method.

One example of a checking method for checking value documents of the predefined value document type which involves using templates predefined for predefined positions of the production elements is illustrated roughly schematically in FIG. 9. Templates used can be, in particular, templates and assigned position sub-region data which were determined by one of the described examples of adaptation methods. The checking method can be carried out by means of the value document processing device 10. The templates and assigned position sub-region data can be stored in the evaluation unit 47, for example.

In the checking method, in step S20, during the transport of such a value document, by means of the sensor unit 38, in particular the image capture unit 40, a digital value document image of the value document to be checked that is being transported past or through the sensor unit 38 is captured. The digital value document image comprises pixels each assigned pixel data. The resolution of the value document image corresponds to that of the training images. That means that the value document images have substantially the same numbers of pixels and arrangements as the training images. A representation of such a value document image corresponds to that in FIG. 3C for training value documents. The same correspondingly applies to the templates.

In step S22, a position of the production elements is determined for the captured value document image, in the example use being made of the same method as in the adaptation method in the first example. More precisely, position coordinates are determined in the same coordinate space as was also used in the adaptation method.

Step S24 involves determining, depending on the determined position coordinates, a template for the digital value document image and thus a template for use during the further checking. This is done by checking in which of the stored position sub-regions the position coordinates determined for the current value document lie, with the position sub-region data respectively assigned to the templates being used. In the example, this involves determining more specifically that position sub-region, i.e. rectangle, stipulated by the position sub-region data in which the determined position coordinates lie. The template corresponding to the position sub-region data and thus to the position sub-region is used as a template for the subsequent step S26.

In step S26, the digital value document image is then checked using the determined template by means of a predefined image checking method. In the example of checking contamination, in the image checking method, in the simplest example, for each of the pixels it is possible to check whether the pixel data lie between the minimum and the maximum which are predefined for the pixel by the template. If the number of pixels for which this is not the case exceeds a predefined number, a contamination is recognized, otherwise a sufficiently good state.

Depending on the checking result, step S28 involves generating and outputting a corresponding signal representing the checking result. Depending on this signal, a sorting signal can then be formed and output, as described initially.

Other exemplary embodiments of adaptation methods differ from the first two exemplary embodiments in that, instead of the criterion in regard to the number of position data sets in a position sub-region, the termination criterion contains the criterion that the numbers of position data sets in the position sub-regions differ from a reference value by less than a tolerance portion. The arithmetic mean over the numbers of position data sets in the position sub-regions currently present is used as reference value in the present example. A value of 20%, for example, can be chosen as tolerance portion. A more uniform division can thus be achieved. The division steps may need to be adapted for this, however.

Still other exemplary embodiments can differ from the first two exemplary embodiments described in that, instead of the criterion in regard to the number of position data sets in a position sub-region, the termination criterion contains the criterion that an extent of the position subregions in at least one direction of the coordinate space in each case falls below a predefined maximum extent for the at least one direction. In the example, it is possible to predefine an extent in both coordinate directions. Excessively large position sub-regions can thus be avoided.

Still other exemplary embodiments can differ from the first two exemplary embodiments described in that the termination criterion contains the criterion that the number of position subregions is less than or equal to a predefined number of position sub-regions. This number can be chosen depending on the number of available training images and the necessary speed during checking. Preferably, the criterion used in the preceding paragraph can additionally be used. A termination takes place only when both criteria are satisfied.

Further exemplary embodiments of the adaptation method can differ from the exemplary embodiments outlined above in that N>2, for example N=3, is chosen. In a division step, a division into three new position sub-regions is then effected, but these sub-regions must contain at least the minimum number of position data sets.

Other exemplary embodiments can differ from the exemplary embodiments described above in that the templates are determined from the assigned training images in a different way. By way of example, an average value of the corresponding pixel data of the pixel in the training images can be determined as pixel data for a pixel of the template.

In other exemplary embodiments, the image checking method used can be a method as described in WO2008/058742A1. The template data then have the shape specified there. In the adaptation method, the determination of templates would take place analogously to the determination of the adaptation data in the cited document.

The invention claimed is:

1. A method for generating one or more templates for checking value documents of a predefined value document type, wherein the value documents of the predefined value document type have at least two production elements, wherein digital training images of one or more training documents of the predefined value document type are used, each of which have pixels each assigned pixel data;

the method comprising the following steps:

for each of the digital training images, determining position data sets having position coordinates in a coordinate space each describing the positions of the production elements on the value document at least relative to one another, and forming at least two position sub-regions of the coordinate space, each comprising at least one predefined number of position data sets, the position sub-regions containing no common position data sets, for each of the position sub-regions, generating the one or more templates using the digital training images of the training documents whose position coordinates lie in the position sub-region, and storing the one or more templates and position sub-region data describing the position and extent of each position sub-region.

2. The method according to claim 1, wherein forming the position sub-regions comprises a plurality of division steps comprising at least a first division step that occurs prior to all other division steps, wherein in each of the division steps a current position sub-region from the position sub-regions which contains double or more than double the predefined number of position data sets is in each case-divided into a predefined division number of newly formed position sub-regions each comprising at least the predefined number of position data sets, and the current position sub-region is replaced by the newly formed position sub-regions to form one or more additional position sub-regions, wherein a region containing the position coordinates of all the training value documents is used as a first position sub-region in the first division step, and wherein the division steps are carried out until all the position sub-regions satisfy at least one predefined termination criterion.

3. The method according to claim 2, wherein the coordinate space is n-dimensional where n>1, and in each of the division steps a division is carried out in only one dimension, and successive divisions of the current position sub-region and of any of the newly formed position sub-regions are carried out in different spatial dimensions in each case.

4. The method according to claim 2, wherein the termination criterion comprises a criterion that the position sub-regions contain at most a pre-defined multiple of the predefined number of position data sets.

5. The method according to claim 2, wherein the termination criterion comprises a criterion that the numbers of position data sets in the position sub-regions differ by less than a tolerance portion relative to a reference value.

6. The method according to claim 2, wherein the termination criterion comprises a criterion that an extent of the position sub-regions in at least one direction of the coordinate space in each case falls below a predefined maximum extent for the at least one direction.

7. The method according to claim 2, wherein the termination criterion comprises a criterion that the number of position sub-regions is less than or equal to a predefined number of position sub-regions.

8. The method according to claim 1, wherein generating the one or more templates for the position sub-regions further involves using, for each position sub-region, the digital training images of the training documents whose position data sets lie within a predefined distance from a boundary of the position sub-region but outside the position sub-region.

9. The method according to claim 1, wherein the production elements at least partially overlap each other.

10. A generation device for generating one or more templates for checking value documents of a predefined value document type;

wherein the value documents of the predefined value document type have at least two production elements, wherein digital training images of one or more training value-documents of the predefined value document type are used, each of which have pixels each assigned pixel data, the generation device comprising a storage unit for storing the digital training images, wherein the generation device is configured to carry out the method according to claim 1 using the training images, wherein the generation device has an interface via which the generated templates and position sub-region data can be transmitted to a different device, and the generation device is configured to transmit the generated templates and the position sub-region data to the different device, and/or wherein the generation device is configured to store the generated templates and the position sub-region data in the storage unit.

11. The generation device according to claim 10, wherein the production elements at least partially overlap each other.

12. A non-transitory computer-readable data carrier comprising program code which is executable by a computer so that the computer carries out the method according to claim 1.

13. A method for checking a value document of a predefined value document type, each having two production elements, using templates, produced by the method according to claim 1, which are predefined for predefined position sub-regions for positions of the production elements, the method for checking the value document of the predefined value document type comprising the following steps:

providing a digital value document image of the value document to be checked of the predefined value document type, comprising pixels each assigned pixel data, determining a position of the production elements in the provided value document at least relative to one another, determining at least one of the templates for the digital value document image depending on the determined position of the production elements and the predefined position sub-regions, and checking the digital value document image using the determined template.

14. The method according to claim 13, wherein the production elements at least partially overlap each other.

15. A device for checking value documents, in particular banknotes, each having at least two predefined production elements, in particular print layers and/or security elements, using templates, and position sub-region data assigned to the templates, the device comprising an evaluation unit having at least one memory in which the templates and the position sub-region data respectively assigned thereto are stored, and an interface for providing a digital value document image, wherein the evaluation unit is designed to carry out the method according to claim 13.

16. The device according to claim 15, which furthermore has an image capture unit for capturing the digital value document image of the value document to be checked, said image capture unit being connected to the interface for providing a digital value document image via a signal connection.

17. The device according to claim 15, wherein the production elements at least partially overlap each other.

18. A non-transitory computer-readable data carrier comprising program code which, when executed by a computer, causes the method according to claim 13 to be carried out.

19. A device for processing, in particular checking and/or counting and/or sorting and/or destroying, value documents of a predefined value document type, in particular banknotes, each having at least two predefined production elements, in particular print layers and/or security elements, the device comprising:

a feed unit for feeding individual or separated value documents to be processed, a dispensing unit having at least one dispensing section for receiving processed value documents, a transport unit for transporting the individual or separated value documents from the feed unit to the dispensing unit, and the checking device according to claim 15, wherein the checking device further comprises an image capture unit, wherein the image capture unit of the checking device is arranged on a transport path defined by the transport unit and designed such that the digital value document images of the value documents to be checked that are transported past the image capture unit are captured while being transported past and are provided for the use in the checking device.

* * * * *